United States Patent [19] [11] 3,872,259
Manos et al. [45] Mar. 18, 1975

[54] TRUNK TRANSITION SYSTEM

[75] Inventors: George Manos, Bridgeport, Conn.; Paul V. DeLuca, Port Washington, N.Y.; Vincent F. Santulli, Manhasset, N.Y.; William V. Carney, Valley Stream, N.Y.

[73] Assignee: Porta Systems Corp., Roslyn, N.Y.

[22] Filed: Dec. 29, 1972

[21] Appl. No.: 319,172

[52] U.S. Cl. .................... 179/16 R, 179/98
[51] Int. Cl. .................... H04q 1/18, H04m 3/00
[58] Field of Search .................... 179/98, 175

[56] References Cited

UNITED STATES PATENTS

| | | | |
|---|---|---|---|
| 616,983 | 1/1899 | Speiden | 179/175 |
| 966,728 | 8/1910 | Adams | 179/175 X |
| 1,641,286 | 9/1927 | Mueller | 179/175 |
| 1,744,782 | 1/1930 | Matthern et al. | 179/175 |
| 3,562,435 | 2/1971 | Joel | 179/98 X |

*Primary Examiner*—William C. Cooper
*Attorney, Agent, or Firm*—Philip D. Amins

[57] ABSTRACT

A trunk transition system (TTS) employs a plurality of protector interface circuits (PICs) disposed immediately upon a main or combined distributing frame to selectively switch an outside plant trunk between existing and replacement central office trunks.

An electronic system responds to input trunk-identifying addresses and mode commands, manually or automatically supplied at plural data entry terminals, for accessing and controlling the appropriate PIC.

22 Claims, 31 Drawing Figures

TRUNK TRANSITION SYSTEM

DISCLOSURE OF THE INVENTION

This invention relates to telephony and, more specifically, to automated trunk transition system apparatus for selectively connecting an incoming trunk to old (existing) and new (replacement) central office trunks, as for testing or the like.

The burgeoning demand for increased telephone communications capacity is being met in part by the replacement of older electromechanical switching apparatus (e.g., panel, stepping, or crossbar) with faster, more flexible stored program controlled electronic switching systems (ESS). To that end (and for other purposes as well), as one part of the transition process, trunks from the outside plant must be switched between central office trunks associated with the existing and replacement switching equipment for testing and so forth.

This has been effected in practice by connecting the tip and ring conductors of each of the outside plant trunks and the two central office trunks (hereinafter deemed the "outside plant", "new" and "old" trunks) to a manually operated double pole, double throw switch located somewhere within the central office. Then, each time the outside plant trunk is to be allotted to the other of the new or old trunks, an attendant physically throws the switch actuator.

Such trunk transition procedures are tedious to implement; are error-inducive; and are not readily adapted to automatic control. Moreover, after testing is completed, such procedures require that the new trunk conductors be removed from the testing switc and connected to the outside plant trunk, or at a main frame protective mounting. This reconnection comprises a further source of error and vitiates testing already done.

It is therefore an object of the present invention to provide improved trunk transition apparatus.

More specifically, an object of the present invention is the provision of a trunk transition system which is readily implemented and connected into service, and wherein no new connections are required vis-a-vis the new and outside plant trunks after transition testing is completed.

The above and other objects of the present invention are realized in a specific illustrative trunk transition system where the protector elements (i.e., heat coils and protector blocks) are removed from each trunk protector mounting, and a protector interface circuit (PIC) controlled switching element inserted at each mounting station. The new trunk conductors replace the old trunk conductors at the protector mountings, and wire connections made from the PIC to the old trunk.

The array of PICs, in one-to-one correspondence with outside plant trunks, is controlled by electronic addressing-command apparatus comprising plural data entry terminals for identifying a particular trunk (and therefore a particular PIC), and for entering a mode command identifying the connection required for the outside plant trunk, i.e., to either the old or new central office trunk.

A multiplexer extracts data from a desired input terminal, and the address entered is decoded to signal the corresponding one of the PICs. Depending upon the operation desired, the PIC effects the appropriate trunk interconnection immediately at the protector mounting.

After testing is complete, the PICs are simply removed, and replaced by protector elements to permanently connect the outside plant and new trunks.

In accordance with one aspect of the present invention, manually operative PIC structures may be utilized at the protector mountings.

The above and other objects, features and advantages of the present invention will become more clear from the following detailed description of specific, illustrative embodiments thereof, presented in detail hereinbelow in connection with the accompanying drawing in which.

Figure 1A:
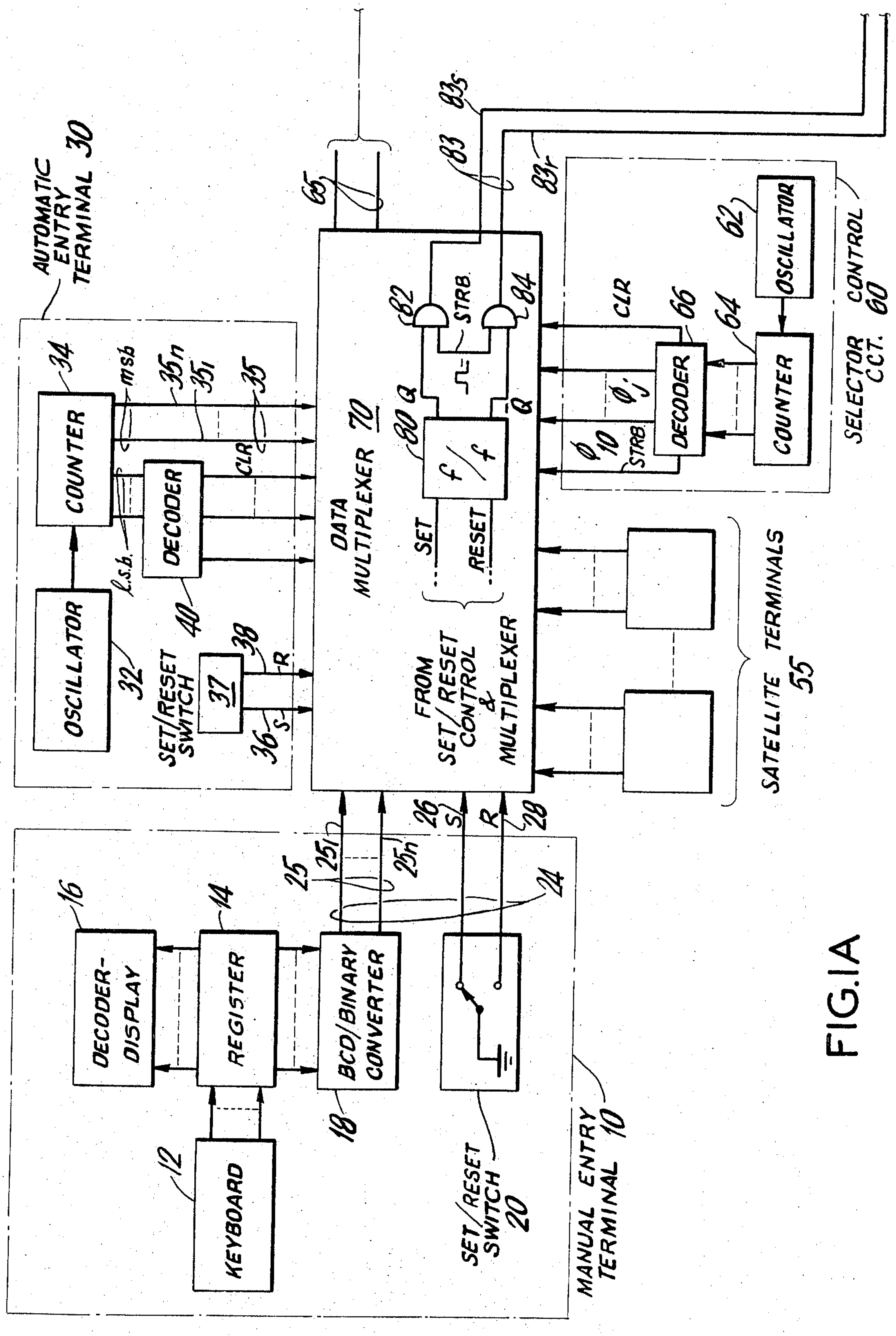
FIGS. 1A and 1B illustrate the electronic functioning of a trunk transition system embodying the principles of the present invention.
Figure 1B:
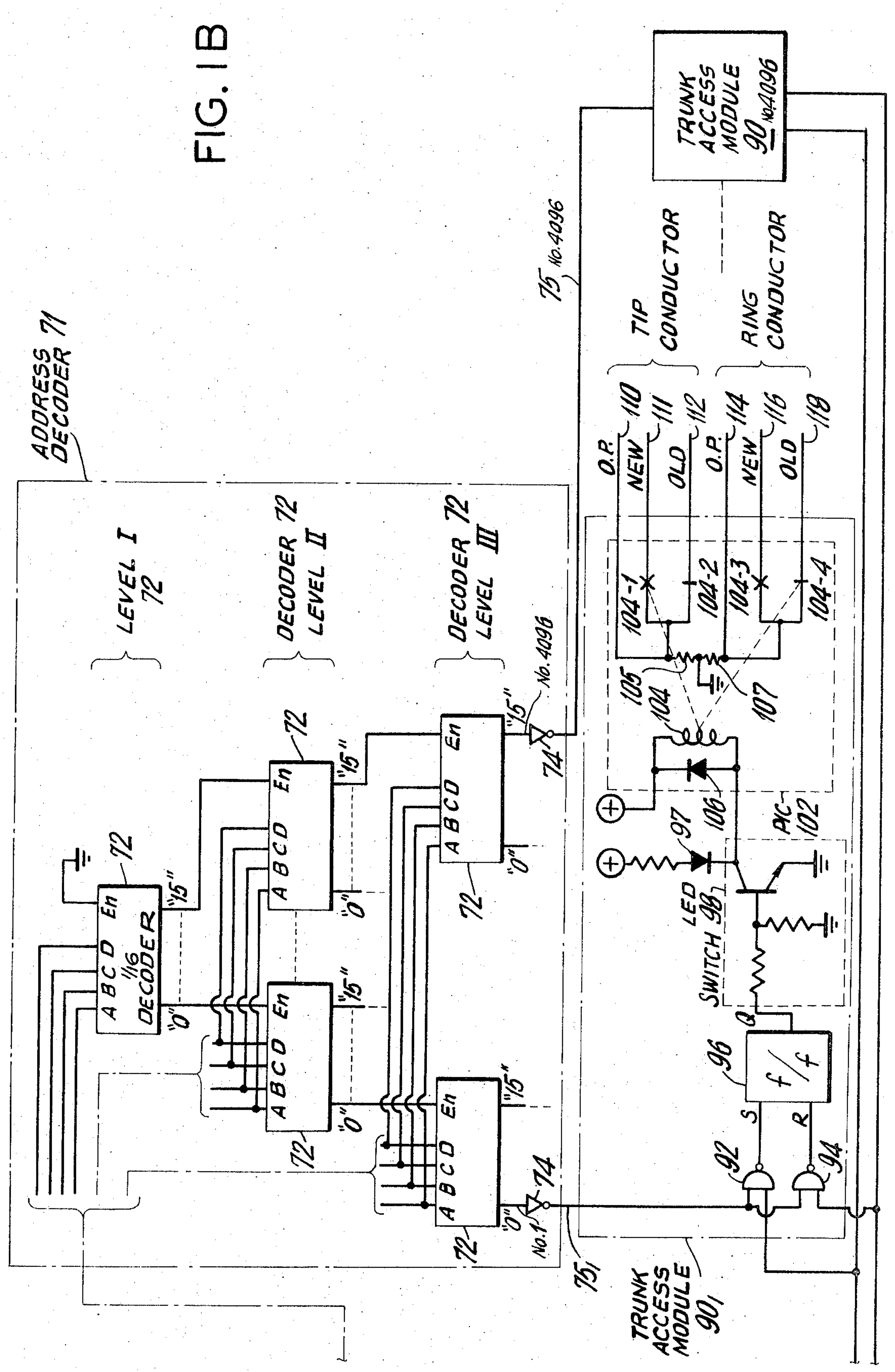

Referring first to FIGS. 1A and 1B, referred to hereinafter as composite FIG. 1, there is shown specific illustrative electronic apparatus for automatically or manually activating particular protector interface circuits (PIC) each associated with different outside plant, new and old trunk conductors as described above. As further briefly set forth hereinabove, and as discussed in particular detail below, each PIC is physically mounted at a specific protector mounting location on a main or combined distributing frame. For purposes of concreteness, it is assumed herein that 4,096 outside plant, new and old, trunk groupings are to be accommodated.

The trunk transition systems comprise a plurality of data entry terminals for identifying a particular trunk (and therefore also a particular PIC in one-to-one correspondence with the trunks), and to also specify the particular mode desired for the related trunk group, i.e., whether the outside plant trunk is to be connected to the new or old central office trunk. The system is shown in FIG. 1 as comprising one manual entry terminal 10, one automatic entry terminal 30, and plural satelite terminals 55 of either type. Each of the data entry terminals is connected to a data multiplexer 70 for converging the PIC-trunk number (herein treated as an "address") from the terminal operatively selected by selector control circuit 60 to a plurality of output address bus 65, and for providing mode signalling via a two conductor bus 83.

As will become more clear from the following, the address information on bus 65 is processed by a composite address decoder 71 to provide a relatively high output pulse on one and only one of plural output conductors 75 responsive to each entered command, and to provide mode signalling on the leads 83, as above discussed. A particular one of 4,096 trunk access modules 90 selected by the positive pulse on one of the leads 75 responds to mode signalling on the common bus 83 for providing the desired transfer switching configuration at the PIC to connect outside plant tip and ring conductors 110 and 114 associated therewith to either new trunk tip and ring conductors 111 and 116, or to old trunk tip and ring conductors 112 and 118.

Examining first the manual entry terminal 10, an attendant depresses keys at a keyboard 12 to identify the particular trunk number (i.e., address). The information from the keyboard 12 is entered in a register 14, the contents of which are decoded and displayed by element 16 such that the operator can verifly proper entry. The address contents of register 14 are converted from binary coded decimal to binary form at a converter 18, the output from the converter 18 being supplied as an address input to the data multiplexer 70 by way of conductors 25. Similarly, the terminal 10 includes a set/reset operator-actuated control 20 for signalling whether the outside plant trunk specified by the address on conductors 25 is to be connected to the new trunk (e.g., "set"), or to the old trunk ("reset"). The mode switch 20 may comprise a simple transfer switch, which may be buffered by flip-flops when data entry buffering is desired.

Correspondingly, the automatic entry terminal 30 comprises apparatus for automatically sequencing through the several system trunk addresses. The terminal 30 comprises an oscillator 32 for cycling a counter 34, the most significant bits of the counter 34 at the leads 35 thus providing, sequentially, the addresses of the several trunks and PICs. A decoder 40 receives the least significant counter 34 digits and provides system timing information.

In accordance with one mode of operation for the apparatus of FIG. 1, each of the manual data entry manual data entry terminals 10, 55, . . ., are polled in turn by the selector control circuit 60. To this end, a polling circuit oscillator 62 cycles a counter 64, the contents of which are decoded at 66. The decoder 66 provides a plurality of output signals $\phi_{10} - \phi_j$ to signal the operative period for each of the plural input entry terminals. Moreover, the decoder 66 provides a strobe pulse STRB at the midpoint of each operative period for each entry terminal, and a clear pulse following polling of each system terminal (to reset all system flip-flops whose data is no longer required).

We consider first the address selection to provide a positive pulse at one and only one of the address decoder 71 output terminal 75 responsive to each entered address. During the operative period for any one of the data entry terminals, e.g., that for the manual entry terminal 10, the trunk address data, present on the line 25, is multiplexed out to the multiplexer 70 output bus 65. Structure for multiplexer 70 for effecting the above are well known to those skilled in the art, and may simply comprise coincidence logic responsive to a signal on the $\phi_{10}$ output of selector circuit 60 for passing signals on the conductors 25 to the leads 65. Moreover, integrated circuits are available to directly multiplex the digits on the incoming address leads to the multiplexer 60 responsive to the output of the counter 64.

The multiplexed output digits on the leads 65 are supplied to an address decoder network 71, which may comprise plural decoders 72 arranged in a tree-like configuration as shown. Each decoder element 72 in the decoder tree comprises a circuit for supplying an output signal (a low going pulse for commercially available integrated circuits) at a particular one of 16 output terminals ("0" – "15") when an enable signal (low) is supplied thereto. The particular energized output of the 16 leads is determined by the binary information pattern supplied to input control leads A-D thereof. Accordingly, the four most significant bits in the address 65 are supplied to a level I decoder 72 which thereby energizes the enable input of one (and only one) of the 16 level II decoders, which also receives the next four address digits at the A-D terminals thereof. Accordingly, the selected level II decoder 72 energizes one of the 256 level III decoders 72, which receives the last or least significant four bits of the address on the bus 65. Thus, at the 4,096 outputs of the level III decoders 72, there is one and only one negative going pulse which is inverted in polarity by an inverter 74 (connected to each output lead) such that the leads $75_1$ –$75_{4,096}$ are characterized by one and only one positive going pulse. Further, it is observed that each of the leads 75 is supplied to an associated one of the trunk access modules 90. Accordingly, only one access module 90 is supplied with a positive going pulse on the lead 75 connected thereto at any time, and only one module 90 implements a command to a PIC-trunk organization at any time.

As further inputs to each of the trunk access modules 90, the two conductor bus 83 supplies a pulse to the bus conductor $83_s$ when a connection is desired between the outside plant and new trunks, and a pulse impressed on the bus $83_r$ when a connection from the outside plant and old trunks is desired. To this end, the data multiplexer 70 includes a flip-flop 80 which is either set or reset depending upon the state of the control switch therefor on the terminal selected by the selector circuit 60, i.e., the set/reset switch 20 for the manual entry terminal 10. Thus, the flip-flop 80 is set (high Q output) or reset (high Q′ output as appropriate), the Q and Q′ outputs of the flip-flop 80 thereby partially enabling one of two AND gates 82 and 84 and blocking the other gate. The blocked gate 82 or 84 maintains a passive low potential on the corresponding bus $83_s$ or $83_r$ connected thereto. Thus, when the STRB pulse appears at the midpoint of the operative cycle associated with the selected terminal, the strobe pulse enables the alternate gate 82 or 84 such that a positive pulse appears on the appropriate one of the bus 83 conductors.

We turn now to operation of the trunk access modules 90 and assume that the module $90_1$; illustrated in detail, is selected for operation by a positive pulse on the lead $75_1$. Assume further for purposes of concreteness that a trunk connection between the outside plant and new trunks is desired such that the positive pulse will appear on the bus $83_s$, while the conductor $83_r$ remains low throughout all times of interest. The positive potential on the lead $75_1$ partially enables two NAND gates 92 and 94, the gate 92 (only) being fully switched by the pulse on the bus $83_s$ such that the relatively low output potential of the gate 92 sets a flip-flop 96. Accordingly, the high potential at the Q output of the flipflop 96 activates a switch 98 (e.g., renders a transistor 99 conductive) creating a low impedance from the switch output to ground. The energized switch 98 implements two system functions. First, a light emitting diode 97 is activated to provide a visual display signal that outside plant trunk number 1 is connected to the new central office trunk. Then also, the activated switch 98 energizes a coil 104 of a double pole, double throw relay, a diode 106 being connected in parallel with the coil 104 for conventional transient protection.

The outside plant tip and ring conductors 110 and 114 of the trunk number 1 (in common with all others) are quiescently connected to the tip and ring conductors of the old trunk 112 and 118 by normally closed relay contacts 104-2 and 104-4, the flip-flop 96 nominally being reset and the relay de-energized. When the relay 104 is actuated, the contacts 104-1 and 104-3 close, while the contacts 104-2 and 104-4 open. Thus, a connection is established between the PIC tip conductor 110 and 111 and ring conductors 114 and 116. Accordingly, at the protector mounting, the PIC elements 110–111, and 114–116, establish the desired connections, while the leads 112 and 118 become open circuited to disable the old trunk.

At some later time, when outside plant trunk number 1 is to be connected to the old trunk, appropriate address and mode commands are entered via an entry terminal and system functioning proceeds as above described except that the pulse now appears on the lead $\mathbf{83}_r$ to reset the flip-flop 96 via the NAND gate 94. Accordingly, the switch 98 is deactivated and the PIC reverts to its quiescent state.

The alternate entry terminal operates in a manner very similar to that described above, the most significant output digits of the counter 34 at the conductors 35 energizes one of the leads 75 in the manner identical to that above discussed. Similarly, the mode desired is fed into the multiplexer 70 via a set/reset control 37. Thus, depending upon the setting of the set/reset control 37, the terminal 30 will sequentially set all system trunks to the old or new position as desired, automatically, and without any requirement for manual intervention for each trunk. The automatic entry terminal may generate strobe pulses in the manner described above within the operative period for each state of the counter 34, such that the system may proceed identically in the manner described above. Alternatively, use may be made of the fact that the positive pulses on the leads 75 will themselves form sufficient pulse information to set or reset each control flip-flop 96 as appropriate. Thus, to this end, the set/reset control 37 may ground one of the buses $\mathbf{83}_r$ or $\mathbf{83}_s$ and bring the other one to a "1" signal level thereby partially enabling one of the NAND gates 92 or 94 while blocking the other gate. Thus, as a positive pulse appears on the conductor 75, e.g., the conductor $\mathbf{75}_1$ for the trunk access module $\mathbf{90}_1$, that positive pulse will either set or reset the flip-flop 96 and trunk connections will develop as above described.

Finally, it is observed that two resistors 105 and 107 are employed to dissipate line charges.

Accordingly, the above has shown that the several system protection interface circuits (PICs) may be manually or automatically controlled to effect a desired connection pattern for the several related system trunks.

We turn now to specific configurations for specific embodiments of the PIC 102 included in each of the trunk access modules 90. It will be appreciated that the specific mechanical organization of each form of PIC will vary with respect to the particular form of the telephone protector mounting for which that PIC is to be operative.

FIGS. 2-6 depict a first family of PIC organizations adapted for use with C and similar type telephone protector mountings, e.g., the commonly occurring C50 and C52 mountings.

Figure 2:
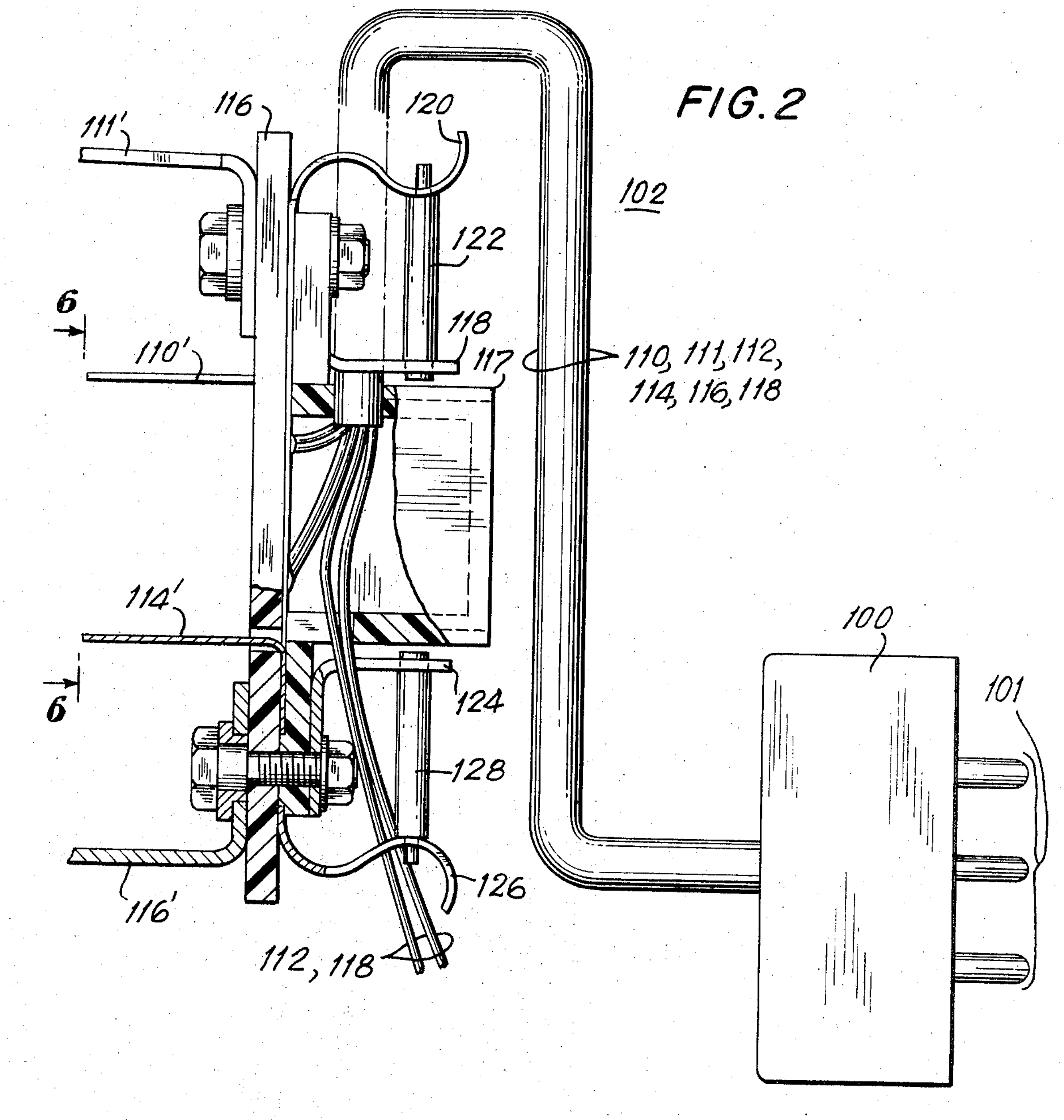
FIGS. 2–6 depict a first family of protector interface circuits (PICs) for C and related type protector mounting.

Examining first FIG. 2 (in conjunction with the electrical functioning thereof shown in FIG. 1), the PIC of FIG. 2 comprises a housing enclosure 100 which includes the relay coil 104 and contacts 104-1 – 104-4, the resistors 105 and 107, and the diode 106. The housing 100 is shown as including prongs 101 for electrical connection to a supply voltage, the output of switch 98, and ground, all as shown in FIG. 1. Emanating from the electrical housing enclosure 100 is a cable which comprises each of the output leads 110, 111, 112, 114, 116, and 118 all having the significance depicted in FIG. 1 and discussed above. The leads 112 and 118, comprising the tip and ring conductors for the old trunk, simply pass through a PIC housing 117 without interconnection, and are adapted to be connected to the tip and ring conductors for the old trunk upon their removal from the protector mounting when the PIC 102 is inserted therein.

The PIC components on the remote end of the cable from the housing 100 comprise an insulative board 116 having connected thereto independent prong members 111′, 110′, 114′, and 116′ which respectively make electrical connections to those members of the protector mounting which are connected to the new trunk tip, outside plant tip, outside plant ring and new trunk ring. The PIC elements 111′, 110′, 114′ and 116′ are electrically connected by printed circuit wiring on the board 116 to the conductors 111, 110 114 and 116, there being no electrical connection between any of the members 111′, 110′, 114′ and 116′ per se at the PIC extended portion. Accordingly, the outside plant trunk tip connector 110′ is connected to either the new trunk tip prong 111′ or the old trunk tip conductor 112 by the relay 104 contacts 104-1 or 104-2 within the housing 100. Similar connection for the PIC pring 114′ to either the new trunk ring prong 116′ or to the conductor 118 is simply made by the relay contacts 104-3 or 104-4. Accordingly, with the PIC pronge inserted within the C or similar type protective mounting (see, for example, FIG. 3 discussed below), appropriate trunk connections are made either immediately at the protector mounting (for connections between outside plant and new trunks) or proximately thereto via the conductors 112 and 118.

When testing (trunk switching) is completed, the extended PIC position is simply withdrawn from the protector mounting, thereby disconnecting both the old and the new trunks from the outside plant trunk. However, the electrical new trunk wiring is already in place. The permanent connection between the new trunk and outside plant trunk is thus readily implemented by simply inserting the protector mounting heat coils (and voltage protective blocks) in place, as is well known to those skilled in the art.

It is also observed that heat coils 122 and 128 may be employed in the PIC 102. For example, with respect to the heat coil 122, a member 120 electrically connected to the prong 110′, and a member 118 electrically connected to the prong 111′ have the coil 122 therebetween. Thus, the coil 122 provides protection for the new trunk should spurious energy be received via the outside plant conductors.

Figure 3:
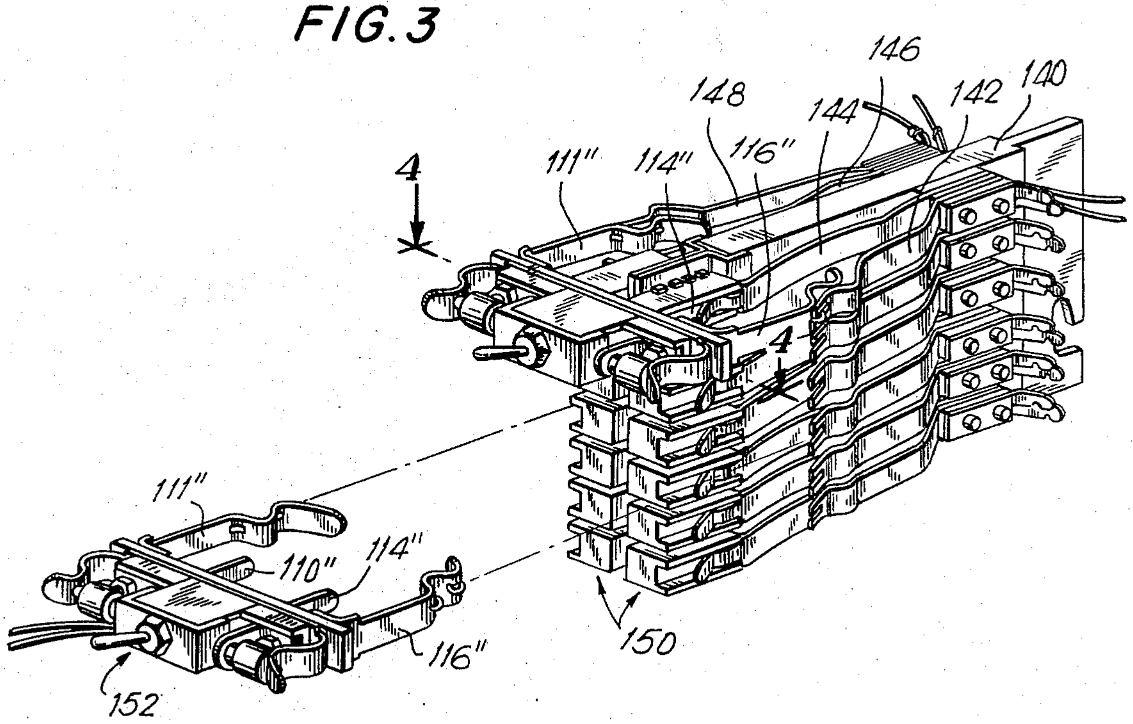
Figure 5:
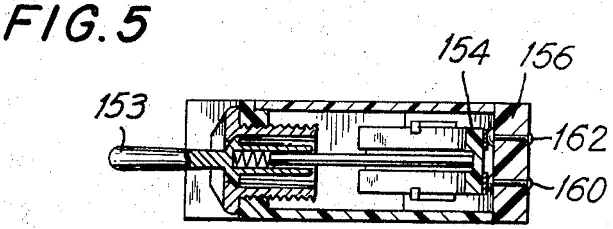
Figure 4:
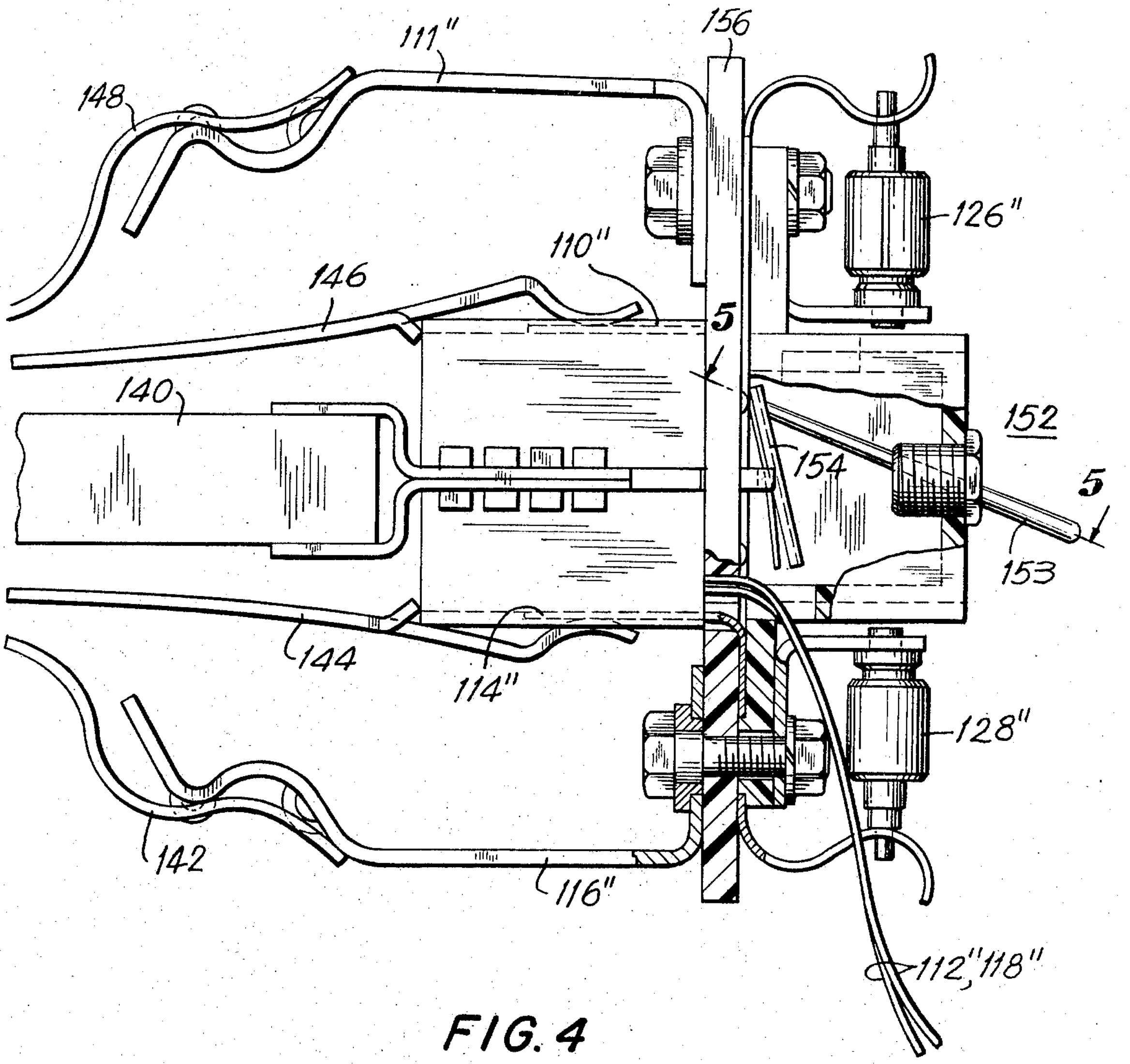

It will be appreciated that the above discussion relates to a PIC organization which is electrically controlled by the electronic accessing structure of composite FIG. 1. It will be appreciated, however, that where remote or automated electronic accessing is not required, a manually operated PIC may be employed, utilizing a manually operative double pole, double throw relay in place of the relay 104 considered above. Such a manually operative PIC arrangement, adapted for use with the C and related type protector mountings, is shown in FIGS. 3-5. The C type protector mounting is a standardized mounting used in telephone central offices and is manufactured and sold by the Western Electric Co. and other manufacturers by this designation. The arrangement includes prongs 111″, 110″, 114″ and 116″, each having the electrical significance associated with the elements identified by like numerals but with a single prime, in FIG. 2. The elements 111″, 110″, 114″ and 116″ engage the protector mounting conductive prongs 148, 146, 144, and 142 when inserted in place, as shown for the inserted PIC in FIG. 3. It will be appreciated that the same PIC protector mounting organization of a secured PIC applies as well for the FIG. 2 arrangement.

The manually operative PICs of FIGS. 3–5 comprise a manually operative switch structure to replace the electronic switching done by the FIG. 1 arrangement (the elements within the housing 100 of FIG. 2). This may simply comprise a toggle switch including a spring biased toggle actuator 153 of any known construction which sets a pivoted follower 154 to one of two positions to electrically connect prongs 110″ and 114″ (connected as common elements in the double pole, double throw switch) to either prongs 111″ and 116″, or to the wires 112″ and 118″.

Figure 6:
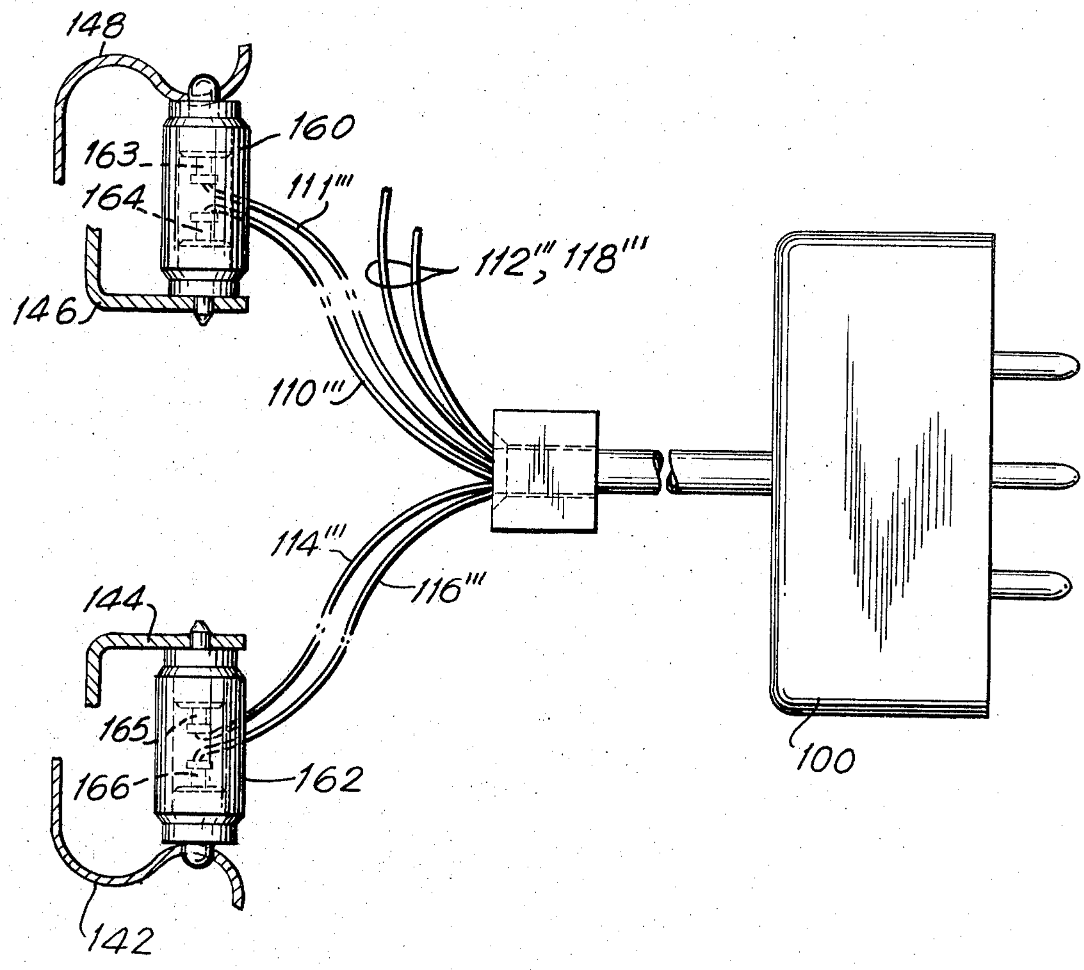
Figure 7:
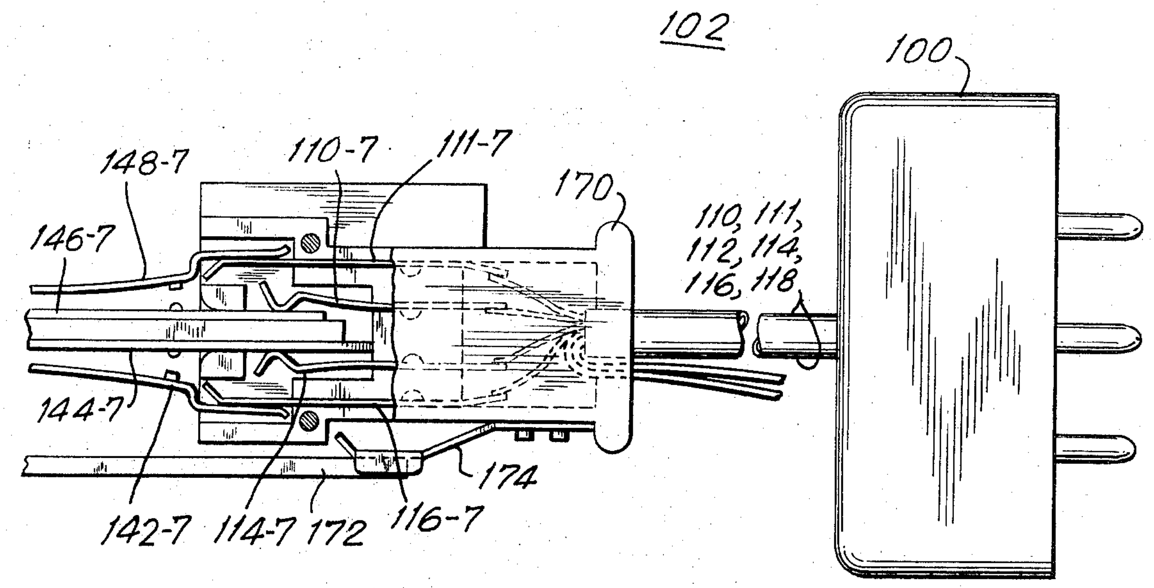
FIGS. 7, 8, 9A, 9B, 10–12 depict a second family of protector interface circuits (PICs) for a 444-type protector mounting.
Figure 8:
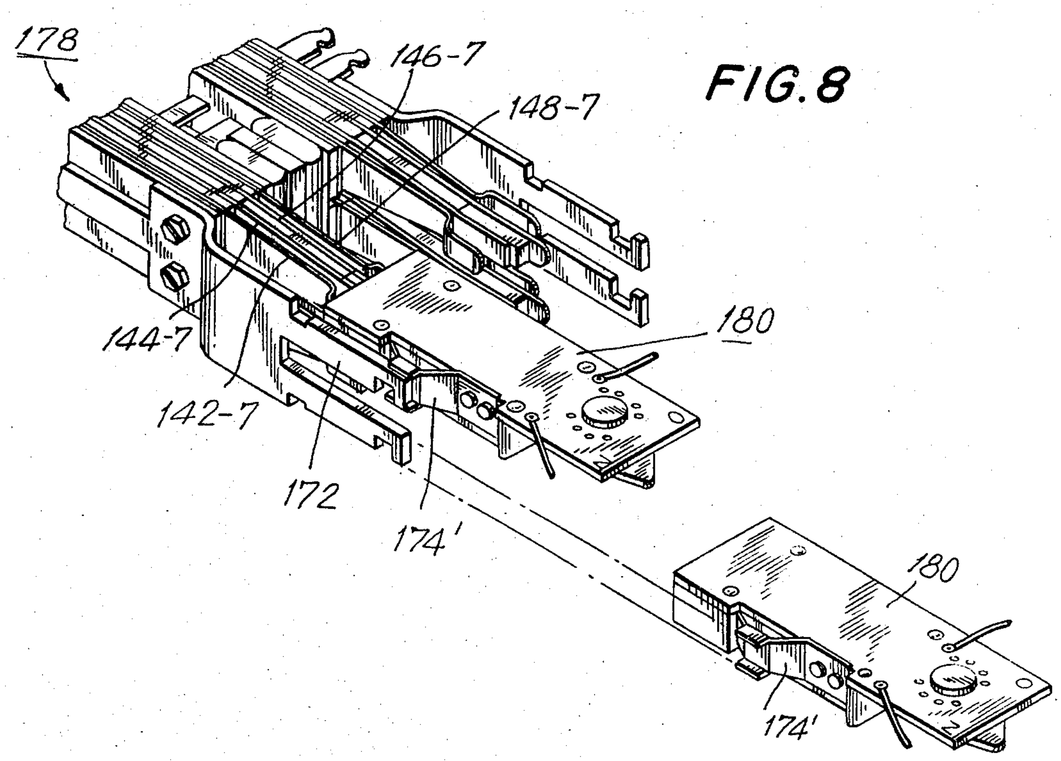
Figure 9A:
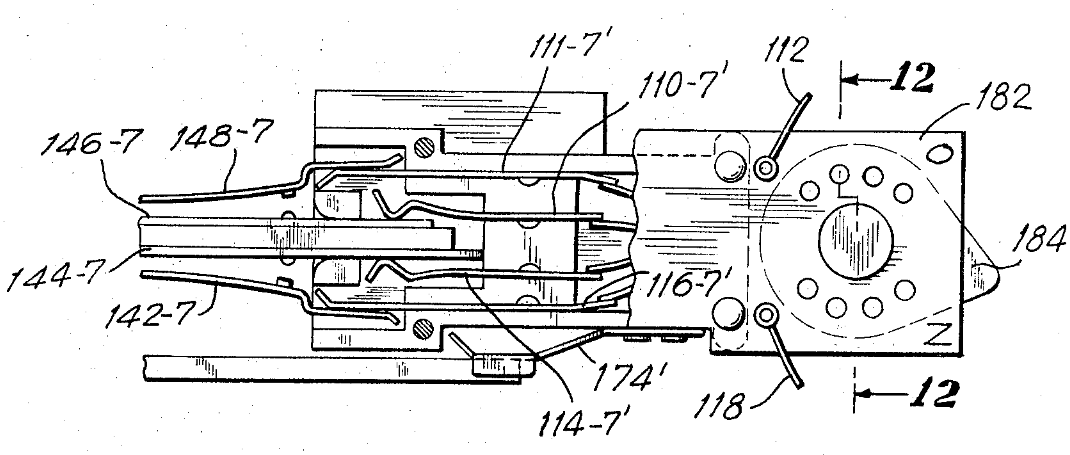
Figure 9B:
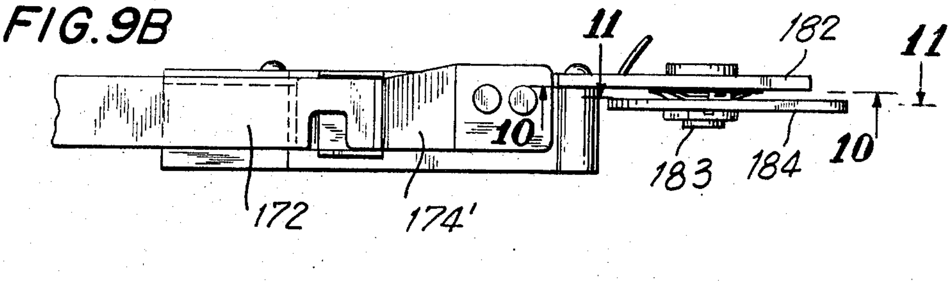
Figure 12:
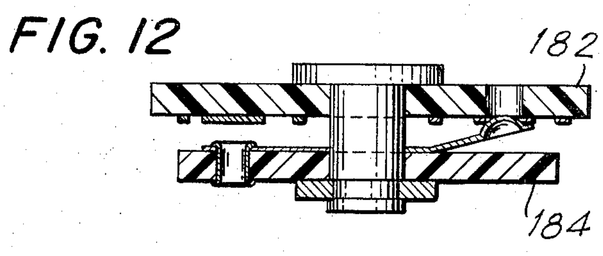
Figure 10:
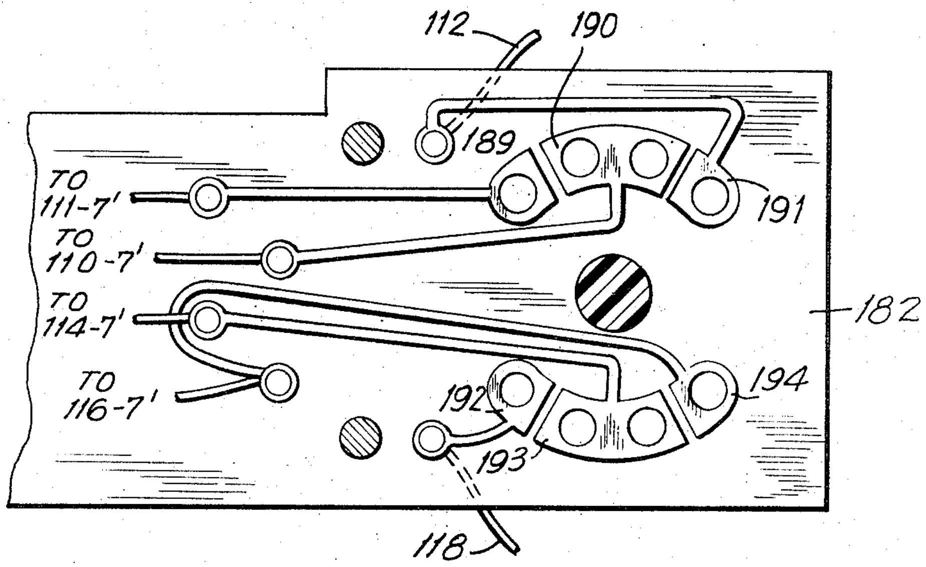
Figure 11:
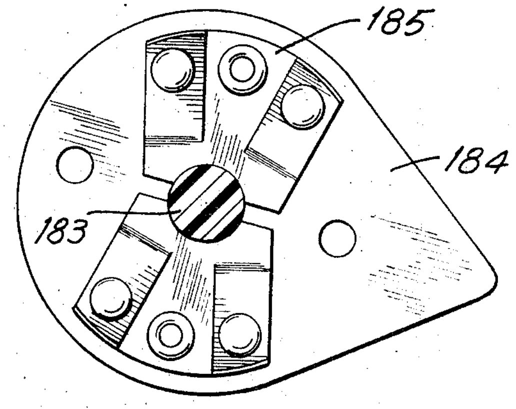

A second implementation for an electronically controlled PIC for C and related type protector mountings is shown in FIG. 6, and comprises bodies 160 and 162 which simply replace the heat coils in each protector mounting station. Examining the element 160, isolated conductor terminals 163 and 164 therein are respectively electrically connected to the protector mounting prongs 148 and 146, and further connected to conductors 110‴ and 111‴ having the electrical significance of the elements 110 and 111 of FIGS. 1 and 2. Thus, mounting elements 148 and 146 are selectively interconnected by switch closures within the housing 100, which is of identical construction to that of FIG. 2. Similar functioning applies as well to the element 162 which selectively connects protector mounting members 142 and 144. Further, connections between the protector mounting 146 and 144 and the old trunk tip and ring engaging conductors 112‴ and 118‴is similarly effected in the manner above stated by the relay 104 within the housing 100.

Referring now to FIGS. 7–12 there is shown a second family of PICs adapted for use on 444-type protector mountings. Examining first FIG. 7, there is shown a composite PIC 102 which operates in a manner electrically identical with the PIC of FIG. 2. That is, the FIG. 7 PIC employs a housing 100 which includes all switching and protective functions for the relay 104, the housing being connected via leads 110, 111, 112, 114, 116 and 118 to the extended PIC portion which is inserted in the protector mounting on the main frame. As before, the leads 112, and 118 to the old trunk simply emanate from the PIC housing 170 without further connection, and the leads 111, 110, 114 and 116 are connected to protector mounting 148-7, 146-7, 144-7 and 142-7 via PIC elements 111-7, 110-7 114-7 and 116-7. For mechanical connection purposes, the 444-type mounting includes a side frame element 172 which is engaged by a spring like channel shaped projection 174 on the PIC frame 170.

A mechanically operable 444-type PIC is shown in FIGS. 8-12, FIG. 8 also showing a typical position for the 444 type protector mounting. The manually operative PIC 180 comprises an insulator board 182 having on one side thereof a wiring pattern such as that shown in FIG. 10. A PIC actuator member 184 is pivotally secured to the element 182 via a pivot 183 and is adapted to reside in one of two positions depending upon the connection desired for the outside plant trunk. Spring biasing — segmented electrical wipers 185 and 186 (FIG. 11) are affixed to the actuator 184 to electrically engage the printed pattern on the board 182, and to also bias and secure the boards 182 and 184. In one of its two positions, the electrical wipers 185 and 186 interconnect the printed circuit elements 189 and 190, and 193 and 194 to connect the outside plant and new trunks. In the alternate position, the segments 190 and 191, and 193 and 192 are interconnected to connect the outside plant trunk with the old trunk.

Figure 13:
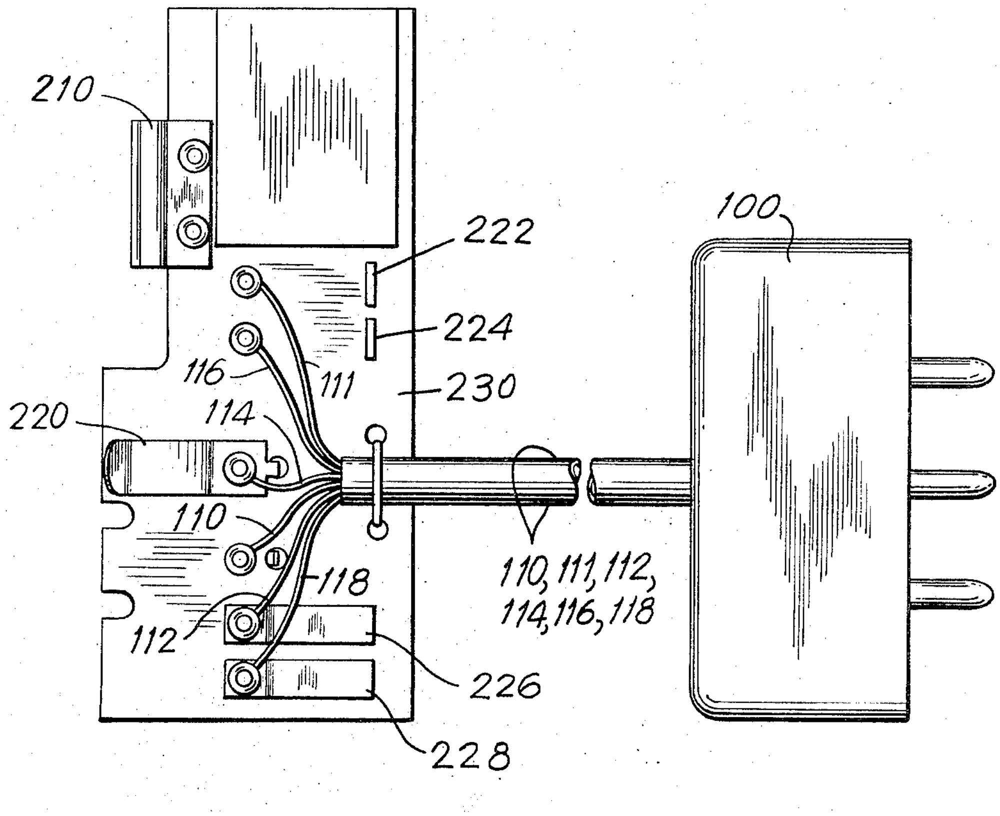
FIGS. 13–20 depict a third family of protector interface circuits (PICs) for a 300 type protector mounting.

Referring now to FIGS. 13–20, there is shown a family of PICs for a 300-type protector mounting. Referring first to FIG. 13 there is shown an electrically controlled PIC cycled by a trunk access module 90 of FIG. 1 and includes a housing 100 and an output cable comprising conductors 110, 111, 112, 114, 116 and 118 as above discussed. The PIC includes a main board 230 having a clip 210 thereon for mechanical mounting onto a 300-type protector mounting position (more particularly shown in FIG. 14). The leads 110 and 114 adapted for electrical connection to the outside plant trunk terminate at clips, the clip 220 atop the board being shown in FIG. 13. The clips engage projections on the protector mounting (see FIG. 14) thereby making electrical connection thereto. Correspondingly, the leads 111, 116, 112 and 118 respectively terminate at spring biased connection clips 222, 224, 226 and 228 respectively. As more fully shown in FIG. 14, an electrical connection is made to one of the clips 222, 224, 226 or 228 by depressing the clip to obtain access to an aperture in one leg thereof, inserting an exposed trunk conductor in that aperture, and releasing the clip so that the trunk connector is firmly seized.

As before, each of the outside plant, new and old trunk conductors terminate on the PIC in a manner to be mutually isolated (at the PIC extended portion), such that all six conductors are coupled to the housing 100 for selective interconnection by the relay 104 there contained, under control of the electronics of FIG. 1.

Figure 14:
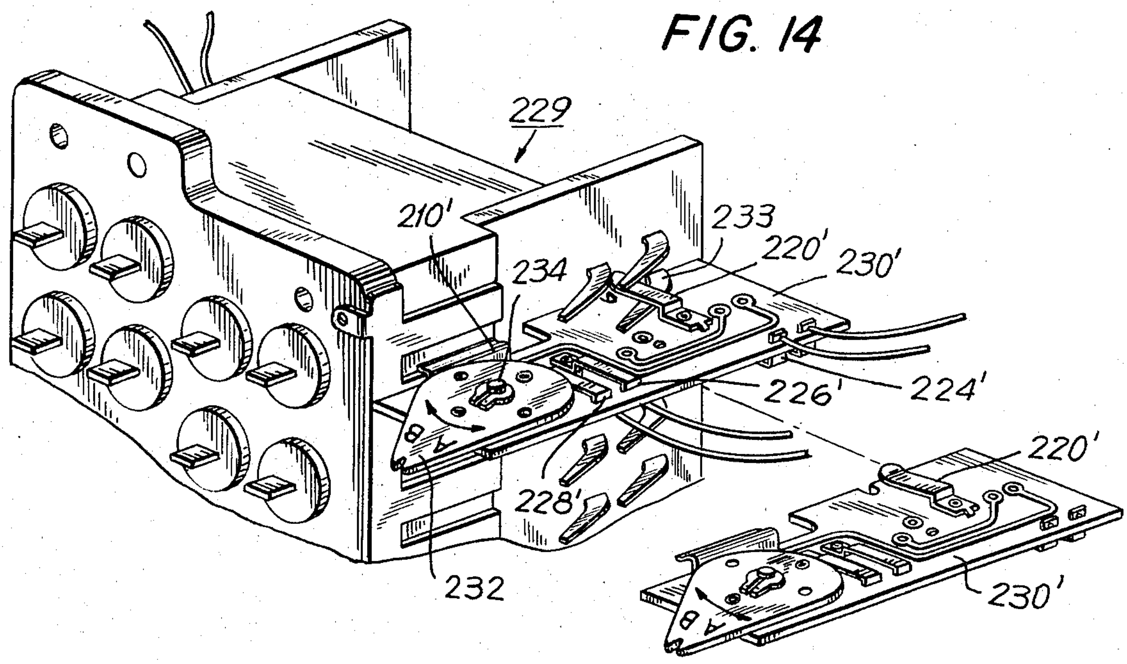
Figure 15:
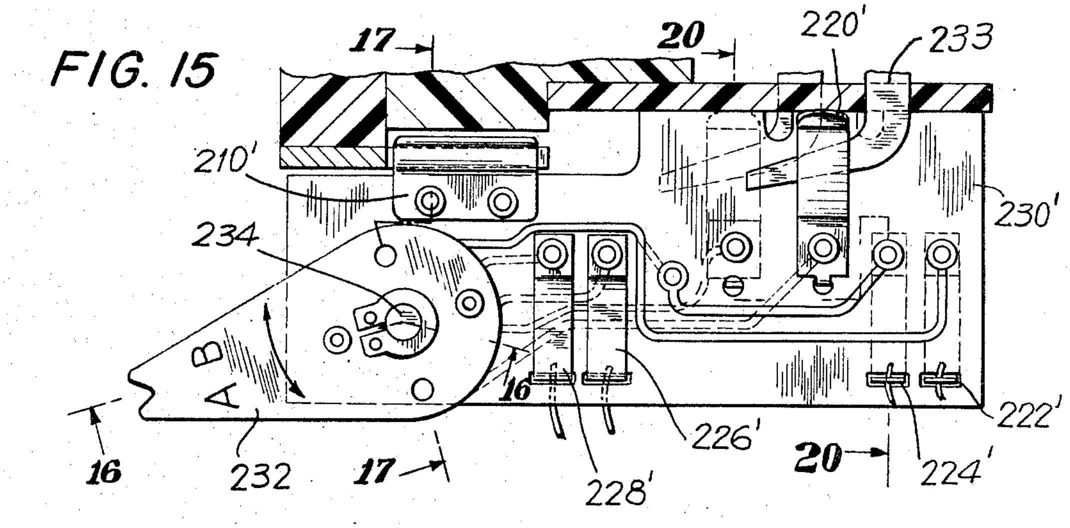
Figure 16:
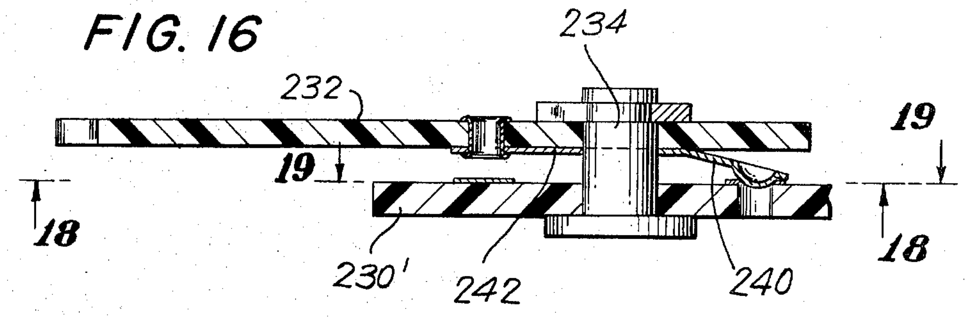
Figure 17:
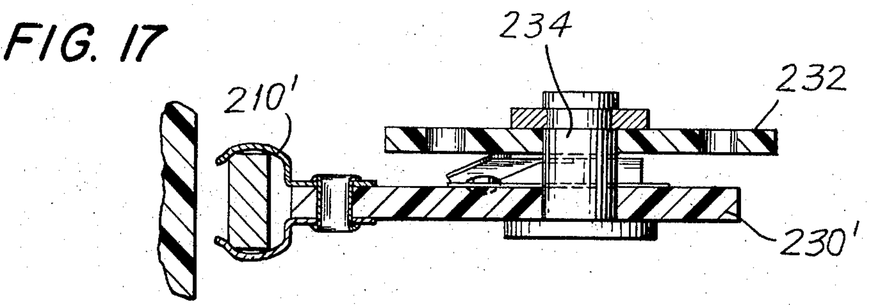
Figures 18, 19:
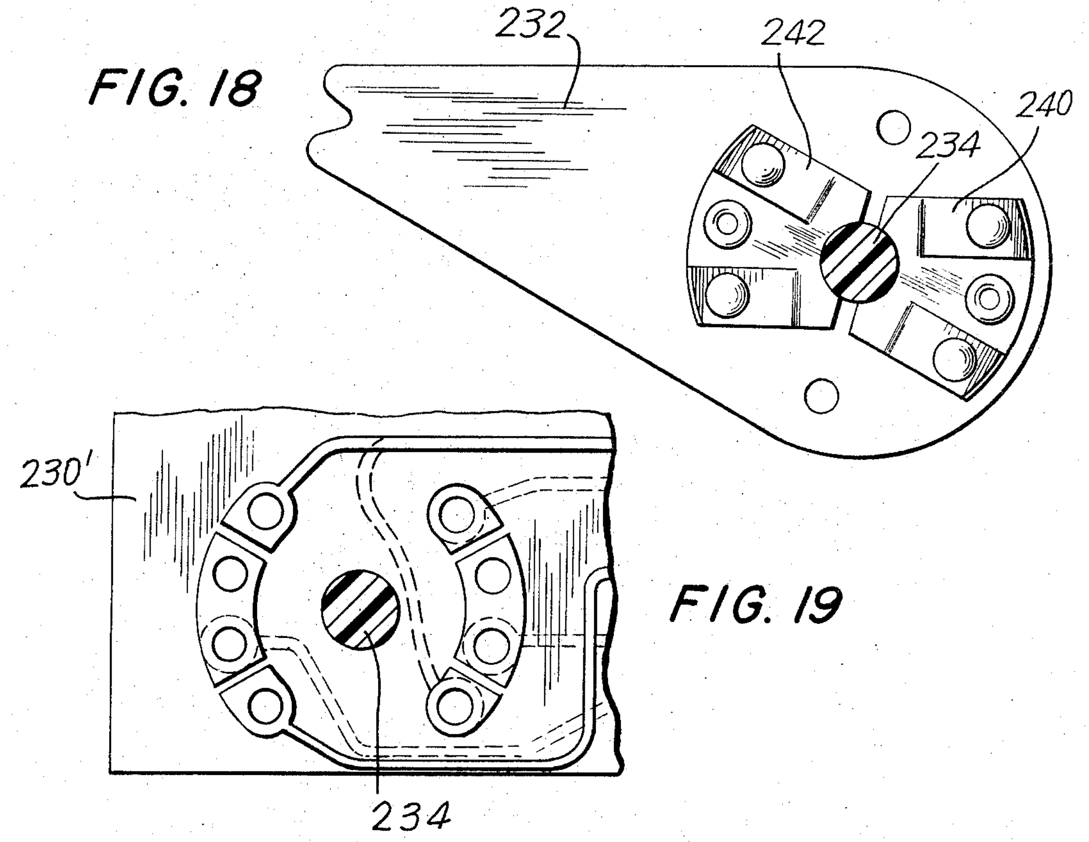
Figure 20:
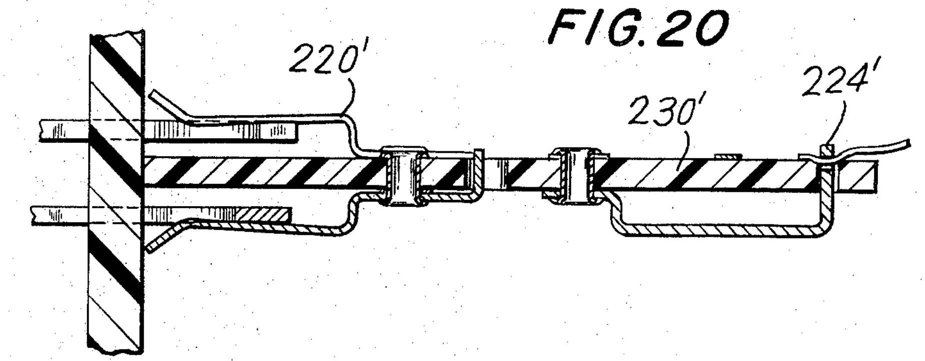
Figure 21A:
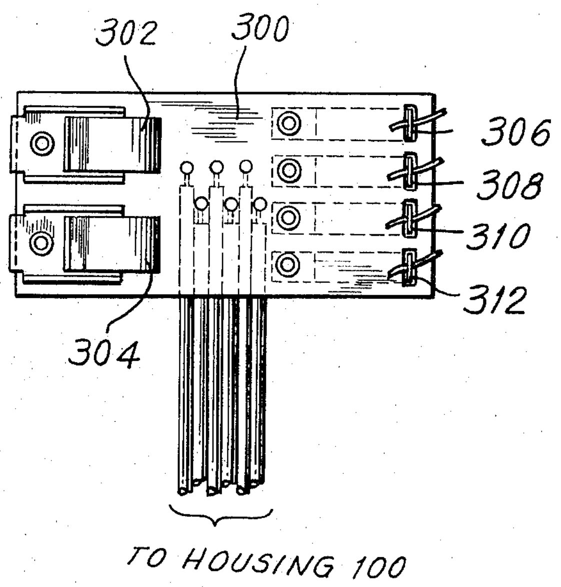
FIGS. 21–28 depict a fourth family of protector interface circuits (PICs) for a TS1 type protector mounting.
Figure 21B:
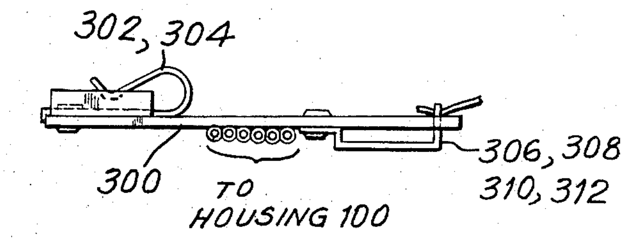

Referring now to FIG. 14, there is shown a manually operative 300-type disposed on a particular station of a 300-type protective mounting 229. The elements 222′, 224′, 226′, 228′, 230′ and 220′ all effect a like function to the corresponding elements of FIG. 13. Moreover, in FIG. 14 the clip 220′ is shown as engaging a projecting connection lug 233 connected to an outside plant trunk conductor, and the new and old trunks are shown connected to the clips 222′, 224′, 226′ and 228′.

The manual PIC configuration of FIG. 14 includes a two position rotatable actuator 232 secured to the board 230 via a pivot 234. As above described, with respect to the type 444 manual PIC, the board 230 has a printed pattern thereon (FIG. 19), the actuator 232 including segmented contacts 240 and 242 thereon to engage the printed pattern on the board 230 and to also mechanically bias and position (by detent location) the elements 232 and 230. In the manner discussed in detail hereinabove with respect to the 444-type PIC, the wipers 240 and 242 connect the outside plant tip and ring trunk conductor to the tip and ring conductors of either the new or old trunk by engagement with the printed pattern and aperture on the board 230 depending upon the position of the actuator 232.

Finally, FIGS. 21-28 show a PIC family for TS 1 type protector mountings. The PIC extended portion for electronic control implementation is shown in FIG. 21A and comprises a board 300 having clips 302 and 304 thereon for seizing projecting lugs 322 and 324 (see FIG. 22) connected to the outside plant trunk leads. As before, the houring 100 (not shown for conciseness) is connected via the leads 110, 111, 112, 114, 116 and 118. Printed wiring on the board connects the leads 110 and 114 with the clips 302 and 304, the conductors 111, 112, 116, and 118 being connected to the clips 306, 308, 310 and 312, each clip receiving an appropriate trunk conductor.

Each of the terminals 302, 304, 306, 308, 310 and 312 are mutually electrically isolated on the board 300 and are interconnected as appropriate via the relay 104 in the housing 100.

Figures 22, 23, 24:
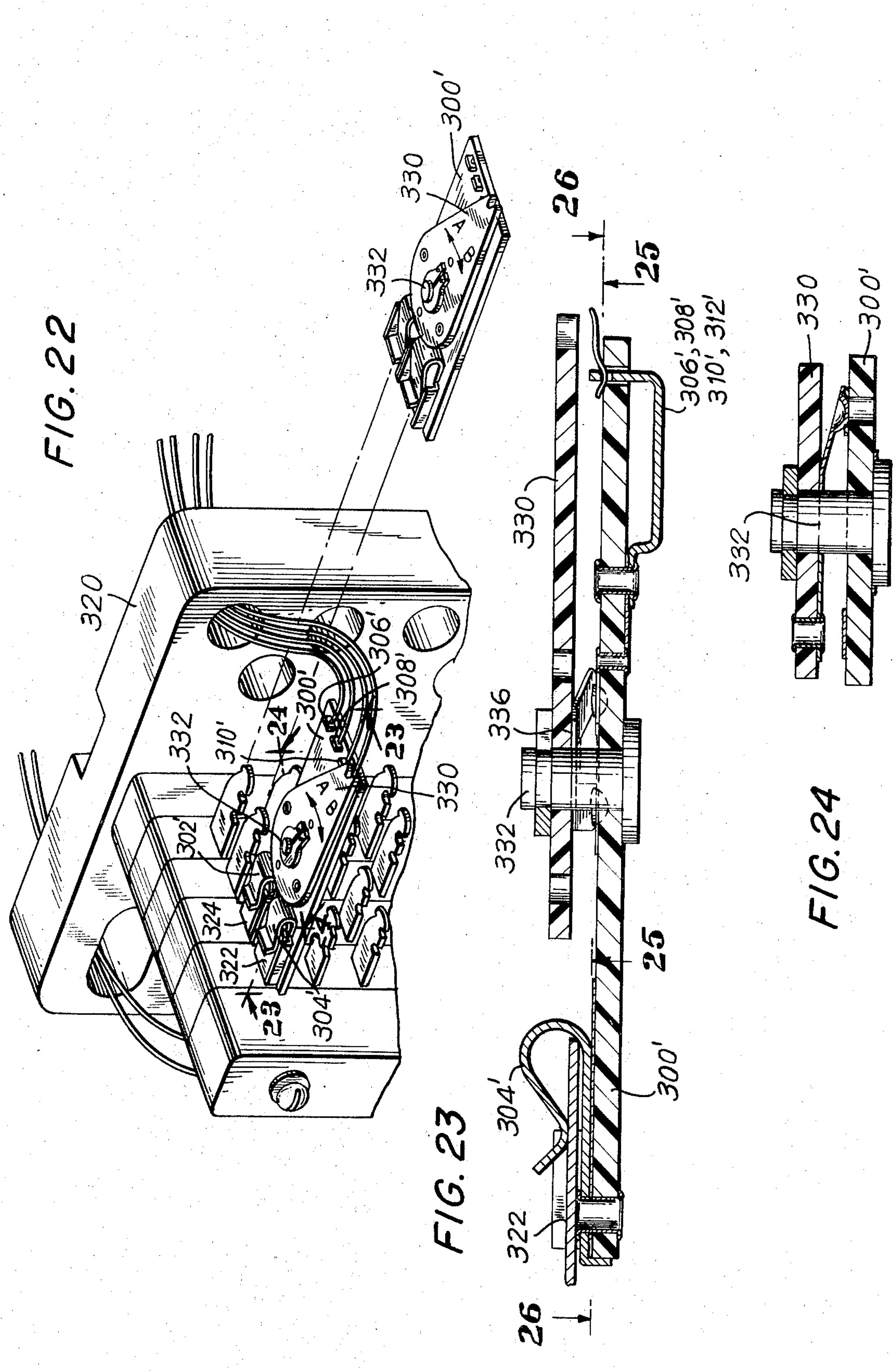

A manually activated PIC is shown in FIG. 22 (and FIGS. 23-27) in a trunk position on a TS 1 type protective mounting 320. Clips 302' and 304' on the board 300' engage the outside plant trunk connecting lugs 322 and 324 on the mounting 320, and the new and old trunk conductors are seized by the clips 306', 308', 310' and 312' in a manner corresponding to that shown in FIG. 21A.

Figure 25:
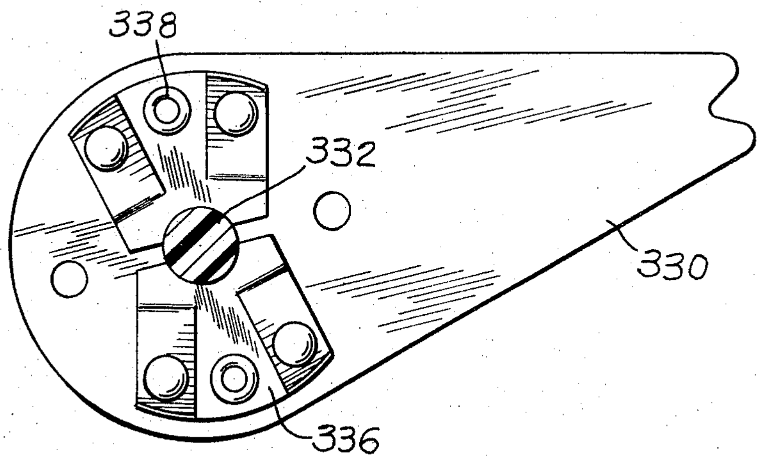
Figure 26:
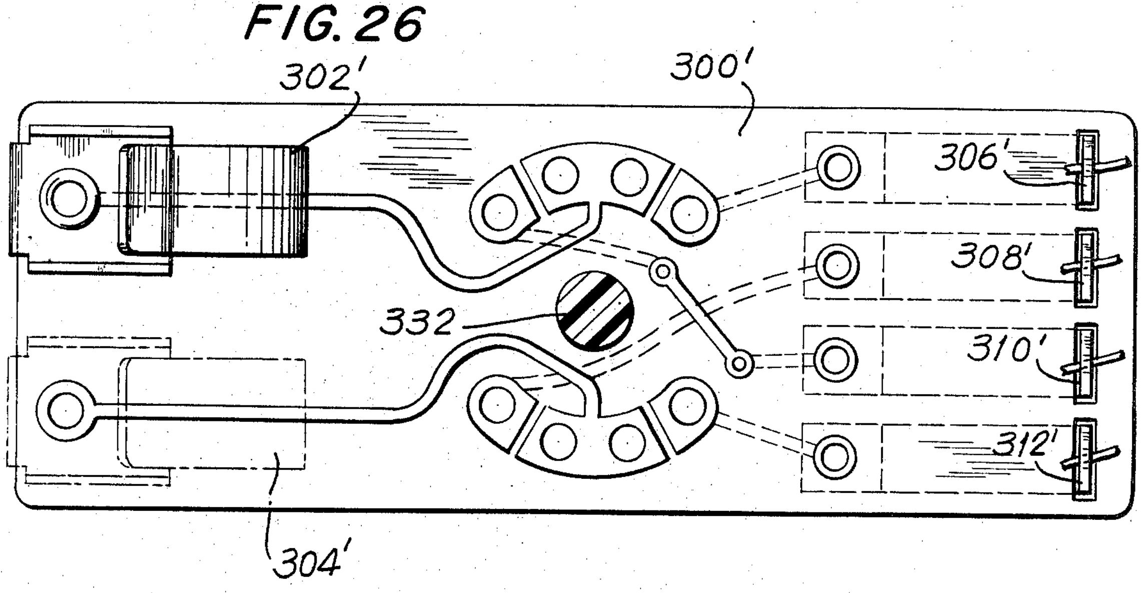
Figure 27:
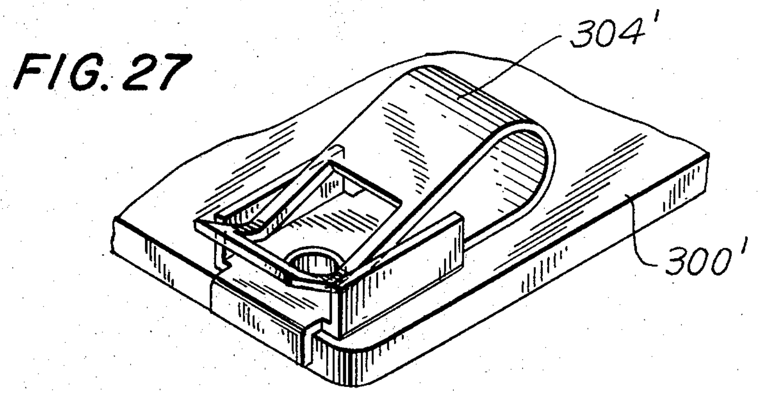

A PIC actuator 330 is pivotally secured to the board 300' via a pivot 332, the board 300' comprising printed circuit wiring as shown in FIG. 26, and the actuator 330 including thereon segmented contacts 336 and 338 as shown in FIG. 25 to electrically engage the printed conductors on the board 300', and to also bias and detent-position the actuator 330 vis-a-vis the board 300'. Accordingly, dependingly, depending upon the relative position of the two elements 300' and 330, the outside plant trunk is connected to either the new or old trunk.

Figure 28:
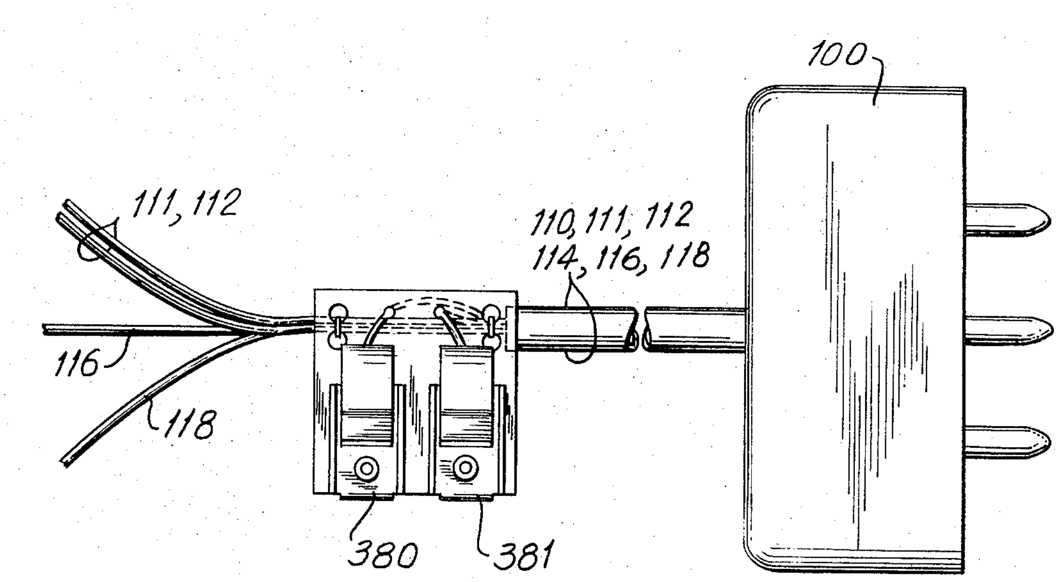

An alternate construction for an electrically controlled TS 1 PIC is shown in FIG. 28, the wires, 111, 112, 116, and 118 from housing 100 being available for direct connection to the new and old trunks.

The above described arrangements are merely illustrative of the preferred embodiments of the present invention. Numerous modifications and adaptations thereof will be readily apparent to those skilled in the art without departing from the spirit and scope of the present invention.

What is claimed is:

1. In combination in a trunk transition system adapted to selectively implement connections between a first plurality of trunks, a second plurality of trunks and a third plurality of trunks, said second and third pluralities of trunks being ordered in one-to-one correspondence with said first plurality of trunks such that each of said first trunks may be connected to an associated one of the second or third plurality of trunks, a plurality of protective interface circuits in one-to-one correspondence with the first plurality of trunks, each of said protective interface circuits comprising first firm conduction means for connection to an associated one of said first trunks, second conduction means for connection to an associated one of said second trunks, and wire output means for connection to the associated one of the third trunks, data input entry means for supplying an address identifying one of said protective interface circuits and one of said first trunks and for supplying the connection mode desired for said protective interface circuit and trunk, a plurality of trunk accessing modules, address decoding means responsive to the address supplied by said data entry means for signalling a particular one of said plurality of trunk access modules including switching means, mode implementing means responsive to the mode entered by said data entry means for signalling the mode desired by said entry means to each trunk access module, each trunk access module including switching means responsive to enabling signals from said address decoding means and said mode signalling means for selectively enabling switching means, said switching means at each of said trunk access modules connecting said first conduction means at an associated one of said protective interface circuits to either said second conduction means thereat or said wire means thereat.

2. A combination as in claim 1, further comprising at least one additional data input entry terminal for providing trunk identification and mode information, data multiplexing means connected to each data input entry means, and selector control means for signalling said data multiplexer, said data multiplexer including means responsive to signalling supplied thereto by said control circuit for selecting the mode and address signals provided by one of said data input entry means for execution.

3. A combination as in claim 1, further comprising automatic input entry terminal means for providing a sequence of addresses, said automatic entry means further comprising mode determining input entry means.

4. A combination as in claim 3, wherein said automatic input entry means includes an oscillator and a counter.

5. A combination as in claim 1, wherein said data input entry means comprises a keyboard, register means for receiving the keyboard output and for supplying address information, and mode input means.

6. A combination as in claim 5, wherein said data input entry means further comprises display means.

7. A combination as in claim 1, wherein said address decoding means comprises a pyramided hierarchy of address decoders, each level of said address decoding hierarchy receiving a different subset of address digits and enabling signals from the next most significant decoding level.

8. A combination as in claim 1, wherein said protective interface circuit comprises a first portion comprising double pole, double throw switching means, wherein the first and second plurality of trunks terminate at a distributing frame protective mounting, and wherein said first and second conduction means of said interface circuit are physically inserted in and connected to the protective mounting and connected to said double pole, double throw switching means.

9. A combination in claim 1, wherein said protective interface circuit is adapted for use in conjunction with a C or related type protective mounting, wherein said first and second conduction means of each of said protective interface circuits comprises two relatively rigid prong members, mounting means having said prong members affixed thereto, and wherein said trunk access means includes a relay having six contacts forming a double pole, double throw switching arrangement, a detachable housing element including said relay and contacts, four wires connecting four of said contacts and said first and second conduction means, two additional wires from the two remaining contacts disposed between said housing and said mounting means.

10. A combination as in claim 9, further comprising heat coil means affixed to said mounting means.

11. In combination, a main frame, a plural position protector mounting on said main frame, each of said protecting mounting positions including means for receiving tip and ring outside plant conductors and tip and ring conductors for a first central office trunk, said protector mounting positions including at least four projecting prongs therein each adapted for electrical connection to a different one of the outside plant and central office tip and ring conductors, and a protective interface circuit apparatus including four projecting prongs physically secured within a protector mounting position such that said prongs of said protector mounting position and said protective interface circuit apparatus are electrically connected, two conductive means adapted for connection to the ttip and ring conductors of a second central office trunk, and double pole, double throw switching means disposed within said protective interface circuit apparatus for selectively connecting the protective interface circuit prings associated with the outside plant trunk conductors to the conductors of one of the first and second central telephone trunks.

12. A combination as in claim 11, wherein said double pole, double throw switching means comprises a manually operated toggle switch secured on said protective interface circuit.

13. A combination as in claim 11, wherein said double pole, double throw switching means comprises a relay.

14. A combination as in claim 13, further comprising data input entry terminal means, and means selectively responsive to a command from said terminal means for activating said relay.

15. A combination as in claim 11, wherein said four protective interface circuit prongs comprise two heat coil form means, each comprising two electrically isolated electrical terminal portion means, and wherein said protector mounting position prongs are formed to accept said two heat coil form means.

16. A combination as in claim 11, wherein said protective interface circuit comprises heat coil means secured between said prongs thereof.

17. A combination as in claim 11, wherein said protective interface circuit comprises first and second members secured for relative rotation, and wherein said double pole, double throw switching means comprises a printed switch terminal pattern of isolated contacts on one of said members, and electrical wiper means actuated by the other of said members.

18. In combination, a main frame, a plural position protector mounting on said main frame, each of said protector mounting positions including means for receiving tip and ring outside plant conductors, said protector mounting position including at least two projecting lugs thereon, each adapted for electrical connection to a different one of the outside plant tip and ring conductors, and a protective interface circuit, including six connector clips thereon, physically secured within a protector mounting position such that said two mounting position lugs and two of said protective interface circuit connector clips are electrically connected, the remaining four clips being adapted for connection to tip and ring conductors of first and second central office trunks, and double pole, double throw switching means for selectively connecting the two protective interface circuit connector clips connected to the outside plant trunk conductor lugs to clips associated with one of the first and second central office trunks.

19. A combination as in claim 18, wherein said double pole, double throw switching means comprises a manually operated toggle switch secured on said protective interface circuit.

20. A combination as in claim 18, wherein said double pole, double throw switching means comprises a relay.

21. A combination as in claim 20, further comprising data input entry terminal means, and means selectively responsive to a command from said terminal means for activating said relay.

22. A combination as in claim 18, wherein said protective interface circuit comprises first and second members secured for relative rotation, and wherein said double pole, double throw switching means comprises a printed switch terminal pattern of isolated contacts on one of said members, and electrical wiper means activated by the other of said members.

* * * * *